(12) United States Patent
Kimura et al.

(10) Patent No.: US 6,711,483 B2
(45) Date of Patent: Mar. 23, 2004

(54) POWER STEERING SYSTEM

(75) Inventors: Kazushi Kimura, Hyogo (JP); Kazunori Miura, Hyogo (JP); Shigeki Ohtagaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,922

(22) Filed: Nov. 6, 2001

(65) Prior Publication Data

US 2002/0173891 A1 Nov. 21, 2002

(30) Foreign Application Priority Data

May 18, 2001 (JP) ......................... 2001-148843

(51) Int. Cl.[7] .................. G06F 19/00; B62D 15/00; B62D 5/00
(52) U.S. Cl. ............... 701/41; 701/1; 180/4.12; 702/85
(58) Field of Search ................. 701/1, 36, 41; 700/279; 180/443, 400, 408, 412, 413; 702/85

(56) References Cited

U.S. PATENT DOCUMENTS 4,722,545 A * 2/1988 Gretz et al. ............... 280/771
2002/0022912 A1 * 2/2002 Urabe et al. .............. 701/41

FOREIGN PATENT DOCUMENTS

JP  10-278816  * 10/1998

* cited by examiner

Primary Examiner—Thomas G. Black
Assistant Examiner—Ronnie Mancho
(74) Attorney, Agent, or Firm—Sughrue Mion, PLLC

(57) ABSTRACT

Disclosed is a power steering system which involves no dedicated equipment, no increase in cost, and no such hardware operation for correction as the mounting of an adjusting resistor. The power steering system includes an external device which outputs an arbitrary torque signal in an error measurement mode, and an electric power steering control device which detects the torque signal, computes the differential between the detected torque value and a reference torque value, stores the differential as a torque correction value, and, in the actual control mode, uses the detected torque value after correcting it by the torque correction value, whereby it is possible to perform reading error correction on a software basis and to expedite and automate the correction.

10 Claims, 5 Drawing Sheets

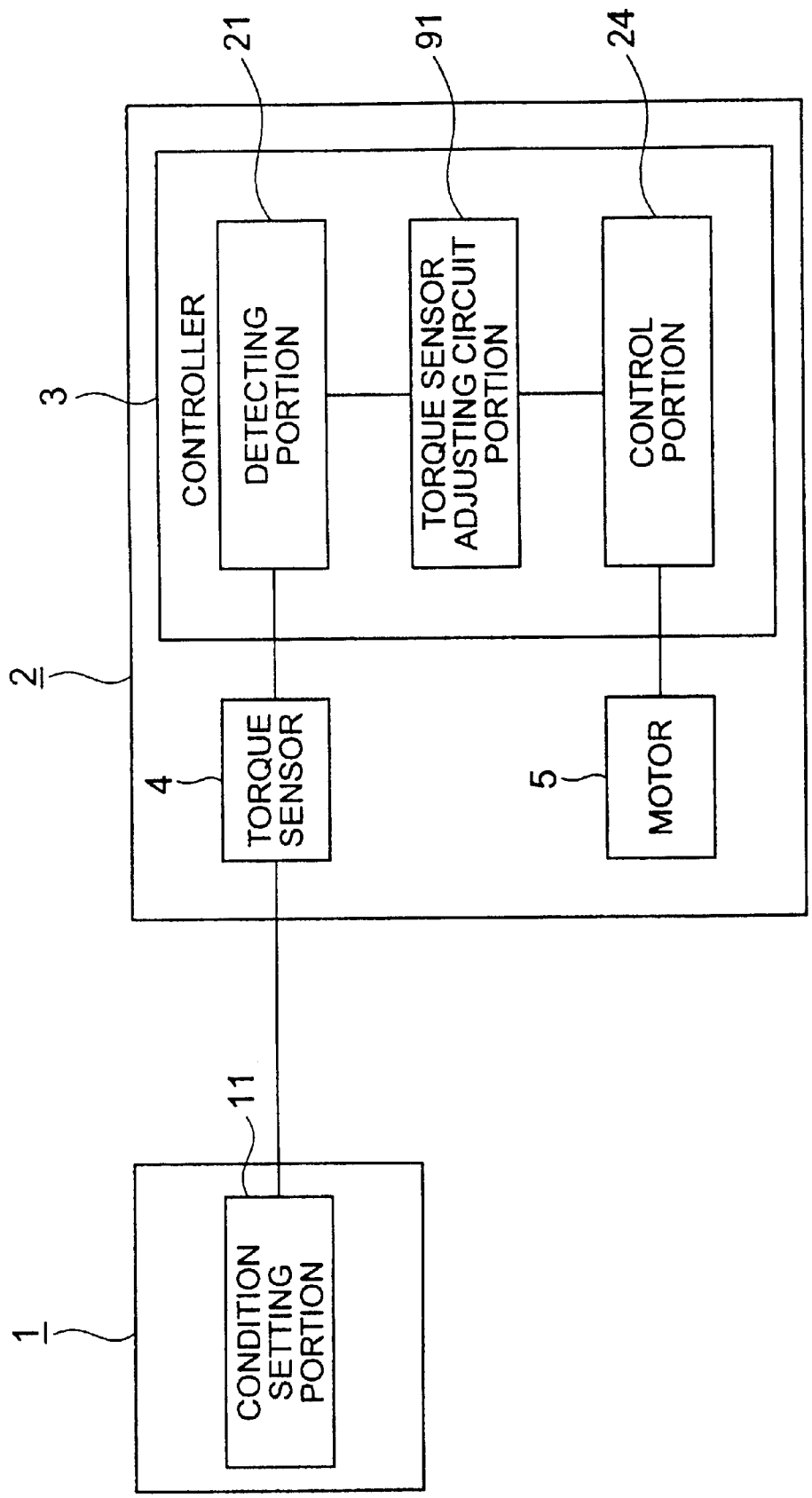

POWER STEERING SYSTEM

This application is based on Application No. 2001-148843, filed in Japan on May 18, 2001, the contents of which are hereby incorporated by reference.

BACKGROUND OF THE INVENTION

1. Field of the Invention

The present invention relates to a power steering system which computes an error in the reading of a detected torque value of an interface circuit of a torque detecting portion by means of a controller for controlling an electric power steering control unit and which makes it possible to effect correction for restraining error on a software basis.

2. Description of the Related Art

A conventional power steering system will be described with reference to the drawings. FIG. 5 is a diagram showing the system configuration of a conventional power steering system.

In FIG. 5, numeral 1 indicates an external device, and numeral 2 indicates an electric power steering control device. Numeral 3 indicates a controller, numeral 4 indicates a torque sensor, and numeral 5 indicates a motor.

Further, in the drawing, numeral 11 indicates a condition setting portion, numeral 21 indicates a detecting portion, numeral 91 indicates a torque sensor adjusting circuit portion, and numeral 24 indicates a control portion.

Next, the operation of the conventional power steering system will be described with reference to the drawings.

In a conventional method for restraining torque value reading error, the precision of the parts used in the detecting portion 21 of the controller 3 is controlled to thereby control the controller 3 so as to involve as few errors as possible.

Further, to achieve an improvement in accuracy, an arbitrary torque signal is input from the external device 1, and a detection torque signal of the controller 3 is measured. To eliminate the error involved, correction is performed on a hardware basis by soldering an adjusting resistor, etc. to the torque sensor adjusting circuit portion 91.

That is, conventionally, the correction of the detection value of the torque sensor 4 is performed as follows. The external device 1 and the controller 3 are connected to each other. An arbitrary torque signal is input from the external device 1, and the torque signal used by the controller 3 is measured. To cancel the differential therebetween, correction for eliminating reading errors is performed on a hardware basis by an adjusting resistor, etc. of the torque sensor adjusting circuit portion 91.

By thus performing correction on the controller 3 on a hardware basis, the torque signal detected by the controller 3 is taken in by the control portion 24 as a normal value, making it possible to perform control.

The conventional power steering system described above has a problem in that when correcting a reading error of the torque sensor 4, which cannot be corrected even by part precision control, it is necessary to perform the correction from outside or provide a reference value for the torque sensor 4, so that dedicated equipment is required, resulting in rather high cost. Further, in effecting correction, it is necessary to perform a hardware operation such as the mounting of an adjusting resistor, etc.

SUMMARY OF THE INVENTION

This invention has been made with a view toward solving the above problem in the prior art. It is accordingly an object of this invention to provide a power steering system in which the correction of the detection torque value is effected not from outside by means of an adjusting resistor or the like but on a software basis, whereby it is possible to cancel the torque-detection interface reading error of the controller itself.

In accordance with the present invention, there is provided a power steering system comprising an external device for outputting an arbitrary torque signal in an error measurement mode, and an electric power steering control device which detects the torque signal, computes the differential between the detected torque value and a reference torque value, stores the differential as a torque correction value, and uses the detected torque value after correcting it by the torque correction value in the actual control mode.

Further, in accordance with the present invention, the external device includes a storage instruction portion for giving instructions to operate in the measurement mode and a condition setting portion for outputting the arbitrary torque signal, and the electric power steering control device includes a torque sensor for detecting a steering torque applied to the steering system of the vehicle, a motor for generating a steering assistance torque in accordance with a control current, and a controller having a detecting portion for detecting the torque signal through the torque sensor, a computing portion for computing the differential between the detected torque value and a reference torque value, a storage portion for storing the differential as a torque correction value, and a control portion which, in the actual control mode, corrects the torque value detected by the torque sensor by the torque correction value and outputs a control current for the motor in accordance with the corrected torque value.

In accordance with this invention, there are provided a power steering system comprising an external device which, in an error measurement mode, outputs an arbitrary torque signal, computes the differential between the transmitted detection torque value and a reference torque value, and sends out the differential as a torque correction value, and an electric power steering control device which detects the torque signal, transmits the detected torque value to the external device, stores the torque correction value transmitted from the external device, and, in the actual control mode, uses the detected torque value after correcting it by the torque correction value.

Further, in accordance with this invention, the external device includes a first communicating portion which gives instructions to operate in the measurement mode, receives the detected torque value, and sends out the torque correction value, and a condition setting portion for outputting the arbitrary torque signal, and the electric power steering control device includes a torque sensor for detecting a steering torque applied to the steering system of the vehicle, a motor for generating a steering assistance torque in accordance with a control current, and a controller having a detecting portion for detecting the torque signal through the torque sensor, a second communicating portion for transmitting the detected torque value to the external device and receiving the torque correction value, a storage portion for storing the received torque correction value, and a control portion which, in the actual control mode, corrects the torque value detected by the torque sensor by the torque correction value and outputs a control current for the motor on the basis of the corrected torque value.

Further, in this invention, the first communicating portion of the external device and the second communicating portion of the controller are connected to each other in a wireless fashion.

Furthermore, in this invention, the torque correction value is a gain correction value of the torque signal.

BRIEF DESCRIPTION OF THE DRAWINGS

FIG. 5 is a block diagram showing a conventional power steering system.

DESCRIPTION OF THE PREFERRED EMBODIMENTS

Embodiment 1

Figure 1:
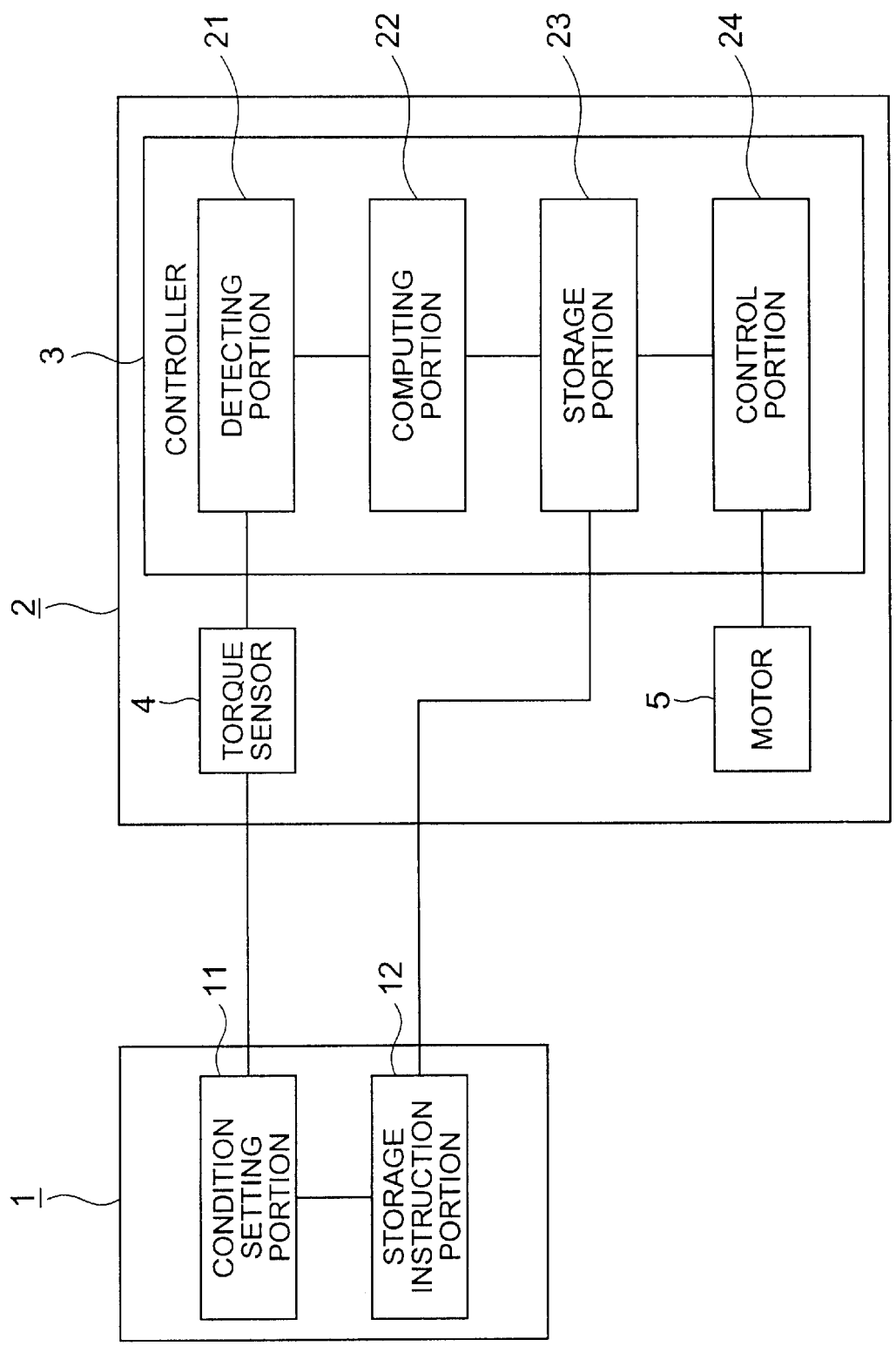
FIG. 1 is a block diagram showing a power steering system according to Embodiment 1 of this invention.

A power steering system according to Embodiment 1 of this invention will be described with reference to the drawings. FIG. 1 is a block diagram showing a power steering system according to Embodiment 1 of this invention. It is to be noted that in the drawings, the same or equivalent components are indicated by the same reference numerals.

In FIG. 1, numeral 1 indicates an external device constituting a part of an inspection apparatus of a production line and formed by a personal computer or the like, and numeral 2 indicates an electric power steering control device. Numeral 3 indicates a controller, numeral 4 indicates a torque sensor for detecting a steering torque applied to the steering system of the vehicle, and numeral 5 indicates a motor for generating a steering assistance torque for the steering system of the vehicle in accordance with an electric current from the controller 3.

Further, in the drawing, numeral 11 indicates a condition setting portion for determining a torque value (reference torque value) to be supplied to the controller 3, numeral 12 indicates a storage instruction portion for placing the controller 3 in a mode in which storage is possible (error measurement mode), numeral 21 indicates a detecting portion, numeral 22 indicates a computing portion, numeral 23 indicates a storage portion, and numeral 24 indicates a control portion. The condition setting portion 11 and the storage instruction portion 12 are provided in the external device 1, and the detecting portion 21, the computing portion 22, the storage portion 23, and the control portion 24 are provided in the controller 3.

Next, the operation of the power steering system of Embodiment 1 will be described with reference to the drawings.

Figure 2:
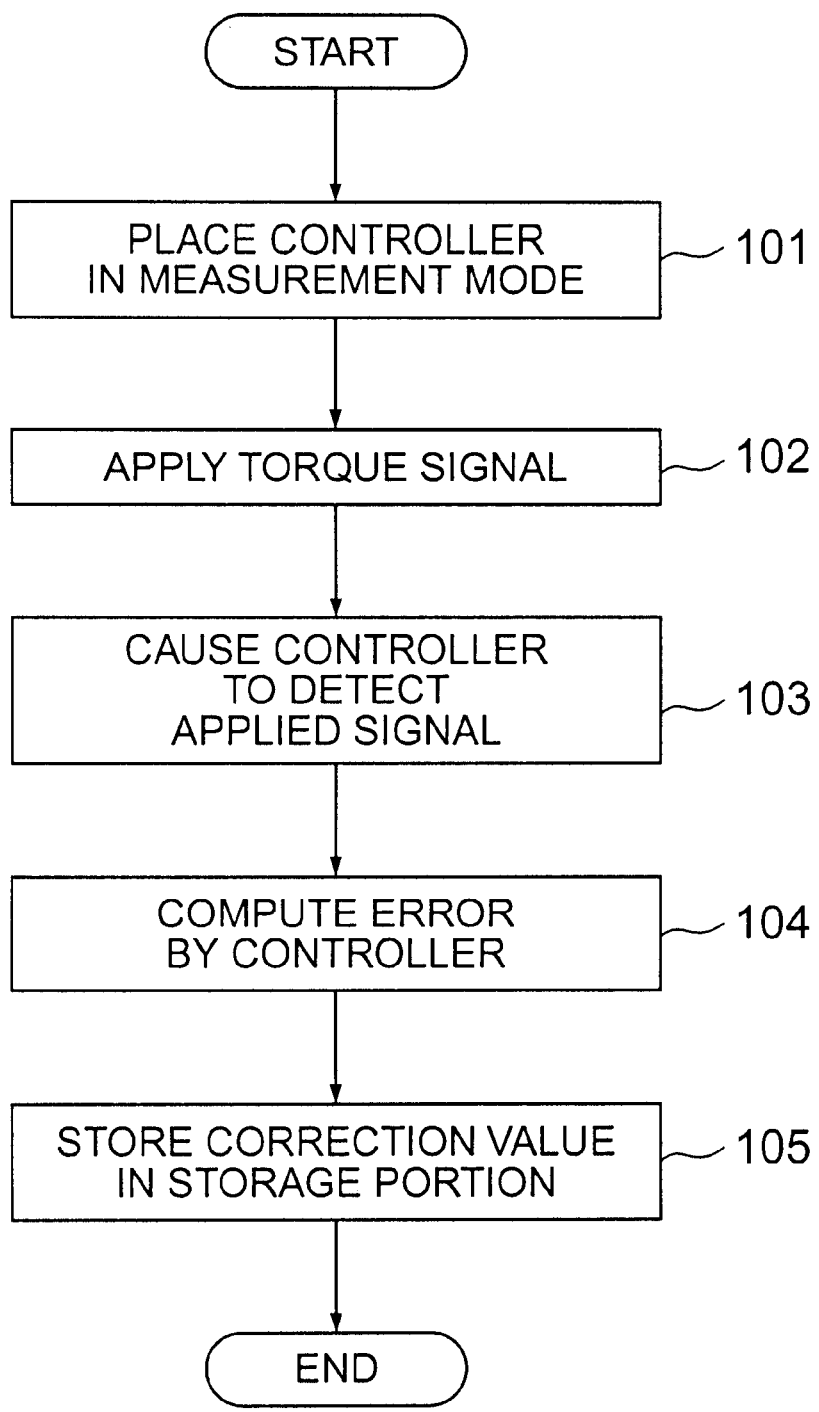
FIG. 2 is a flowchart showing the operation of a power steering system according to Embodiment 1 of this invention.

FIG. 2 is a flowchart illustrating the operation of the power steering system of Embodiment 1 of this invention.

In step 101, the external device 1 places the controller 3 of the steering control device 2 in the error measurement mode by means of the storage instruction portion 12. That is, by connecting the external device 1, the controller 3 realizes that it is in a state in which a torque correction value (offset) is stored (error measurement mode). At this time, the controller 3 resets the torque correction value of the storage portion 23 to place the system in a non-correction state.

Next, in steps 102 and 103, the external device 1 applies an arbitrary torque signal by means of the condition setting portion 11. On the other hand, the controller 3 detects a torque value of the torque signal at that time obtained through the torque sensor 4 by means of the detecting portion 21.

Next, in steps 104 and 105, the controller 3 obtains, through computation by the computing portion 22, the differential between a reference torque value provided internally beforehand and the torque value of the detected arbitrary reference torque signal. And, it stores the differential in the storage portion 23 as a torque correction value.

And, when controlling the motor 5 by the control portion 24 (actual control mode), the controller 3 can cancel the reading error of the torque reading interface of the controller 3 by performing correction on the torque value detected by the detecting portion 21 on the basis of the torque correction value (differential) stored in the storage portion 23.

That is, the power steering system of Embodiment 1 comprises the electric power steering control device 2 equipped with the torque sensor 4 for detecting a steering torque applied to the steering system of the vehicle, the controller 3 for supplying an electric current in accordance with the magnitude and direction of the steering torque to the motor 5, and the motor 5 for generating a steering assistance torque in accordance with the electric current, and the external device 1 capable of generating torque signal, wherein when the torque signal is supplied from the external device 1 to the controller 3, the differential between the torque value of the torque signal detected by the controller 3 and the reference torque value provided inside the controller 3 beforehand is computed by the computing portion 22, and the value thus obtained can be stored in the storage portion 23 inside the controller 3, thereby providing a function by which reading error in the interface portion of the controller 3 itself is restrained.

As described above, in Embodiment 1, the reading error correction of the torque signal detecting circuit of the controller 3 can be realized not on a hardware basis but on a software basis, and software correction is possible independently of the accuracy of the torque signal detecting circuit. Further, the correction can be expedited and automated.

Embodiment 2

Figure 3:
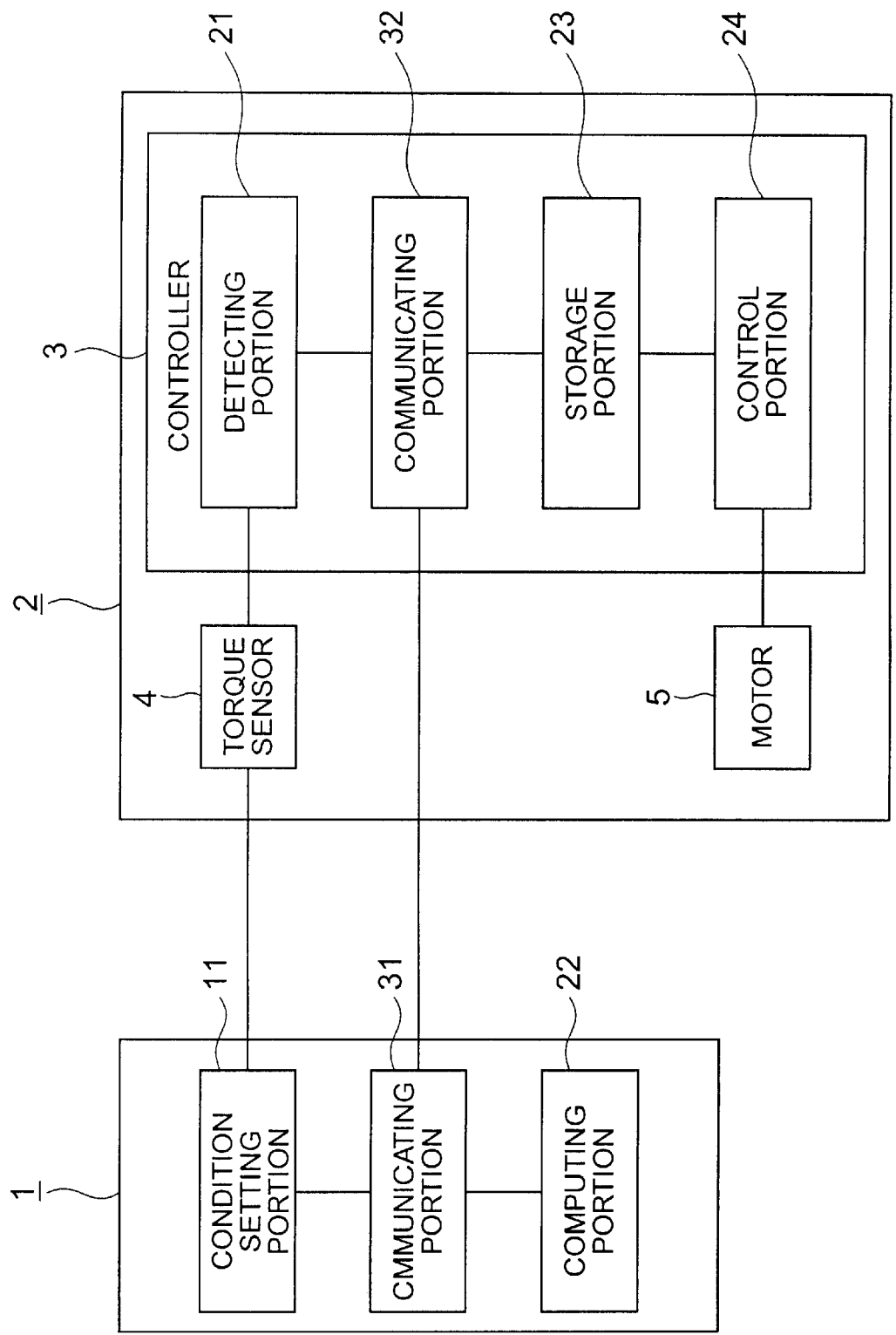
FIG. 3 is a block diagram showing a power steering system according to Embodiment 2 of this invention.

A power steering system according to Embodiment 2 of this invention will be described with reference to the drawings. FIG. 3 is a block diagram showing a power steering system according to Embodiment 2 of this invention.

In FIG. 3, the components which are the same as or equivalent to those of FIG. 1 are indicated by the same reference numerals. Numeral 31 indicates a communicating portion for the external device, and numeral 32 indicates a communicating portion for the electric power steering control device connected to the communicating portion 31 through a cable.

In Embodiment 2, the computing portion 22 described with reference to Embodiment 1 is provided in the external device 1.

Next, the operation of the power steering system of Embodiment 2 will be described with reference to the drawings.

Figure 4:
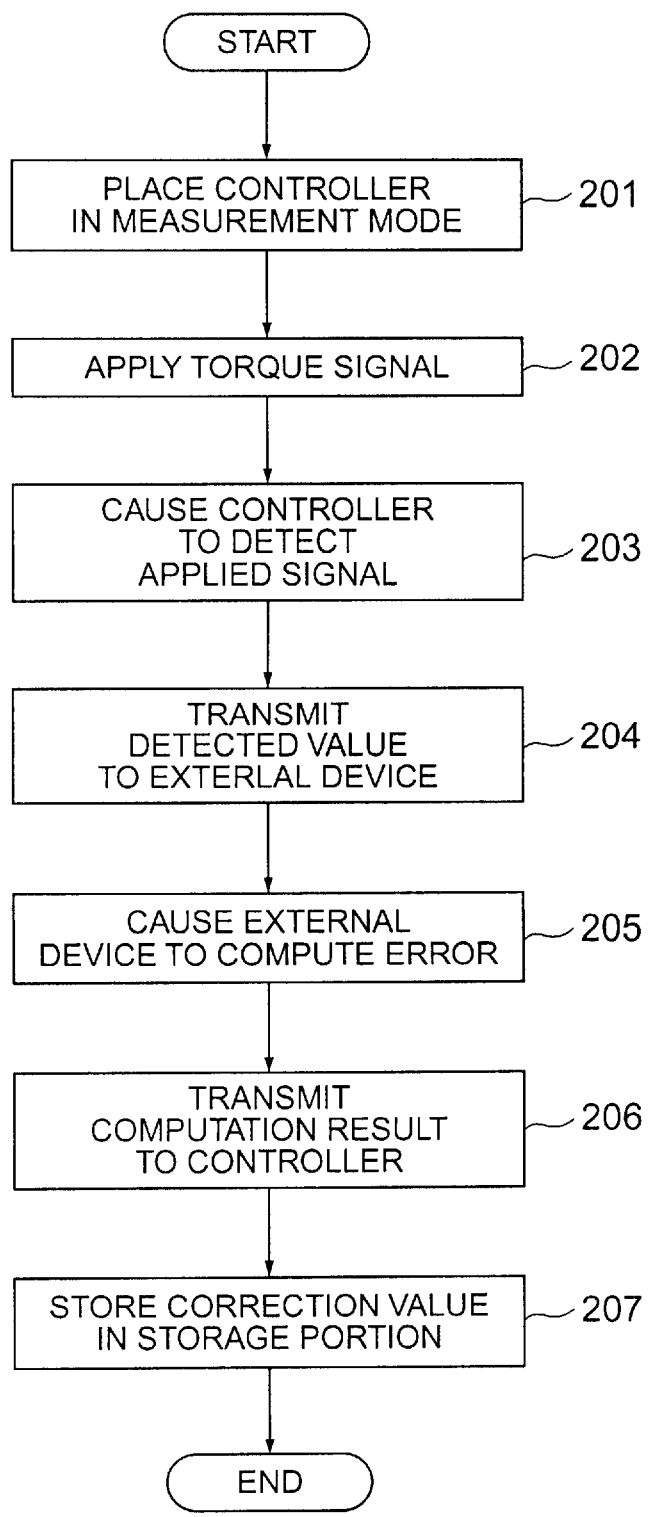
FIG. 4 is a flowchart showing the operation of a power steering system according to Embodiment 2 of this invention.

FIG. 4 is a flowchart showing the operation of the power steering system of Embodiment 2 of this invention.

In step 201, the external device 1 places the controller 3 of the electric power steering control device 2 in an error measurement mode by means of the communicating portion 31. That is, by connecting the communicating portion 31 to the communicating portion 32, the controller 3 realizes that it is in a state in which the torque correction value (offset)

is stored (error measurement mode). At this time, the controller 3 resets the torque correction value of the storage portion 23 to place the system in a non-correction state.

Next, in step 202, the external device 1 supplies an arbitrary torque signal to the controller 3 by way of the torque sensor 4 of the electric power steering control device 2 by means of the condition setting portion 11.

Next, in steps 203 and 204, the controller 3 detects a torque value of the torque signal at that time by means of the detecting portion 21, and transmits the detected torque value to the external device 1 by means of the communicating portions 32 and 31.

Next, in steps 205 and 206, the external device 1 computes, by means of the computing portion 22, the differential (offset) between a reference torque value it has provided and the detected torque value transmitted to thereby obtain the torque correction value. The external device 1 transmits the torque correction value to the controller 3 by means of the communicating portions 31 and 32.

Next, in step 207, the controller 3 stores the torque correction value transmitted from the external device 1 in the storage portion 23.

And, when controlling the motor 5 by the control portion 24 (actual control mode), the controller 3 performs correction on the torque value detected by the detecting portion 21 on the basis of the torque correction value stored in the storage portion 23, whereby it is possible to cancel the reading error of the controller 3.

That is, as in Embodiment 1 described above, in the power steering system of Embodiment 2, when an arbitrary torque signal is supplied from the external device 1, the detected torque value of the torque signal detected by the controller 3 is transmitted from the controller 3 to the external device 1 by using the communicating function provided in the external device 1 and the controller 3; in the external device 1, the differential between the detected torque value received and the reference torque value it has provided is computed to obtain the value of the reading error in the torque signal interface portion of the controller 3, and the torque correction value is transmitted from the external device 1 to the controller 3 by using the above-described communicating function, and stored in the storage portion 23 in the controller 3.

As described above, in accordance with Embodiment 2, the computing portion 22 is provided in the external device 1, and a communicating function is provided therein, whereby the electric power steering control device 2 can be adjusted through ordinary torque detection, without having to perform any special computation, and the torque signal correction procedure can be changed solely by changing the external device 1. Further, through communication, the electric power steering control device 2 is caused to realize that it is in the state in which storage is effected (error measurement mode), so that it is possible to effect switching to the error measurement mode from the external device 1 with an arbitrary timing, making it possible to perform correcting operation through control by the external device 1.

Embodiment 3

While in Embodiment 2 described above the communicating portions 31 and 32 are connected to each other through a cable, it is also possible to establish a wireless connection between these communicating portions to realize a protocol allowing communication with a plurality of electric power steering control devices 2, whereby it is possible to effect communication between a single external device 1 and a plurality of electric power steering control devices 2 in a production line, thereby simplifying the equipment of the production line.

Further, since a wireless connection is adopted, it is possible to freely select a production line layout.

That is, in the power steering system of Embodiment 3, the communicating function of Embodiment 2 is made wireless instead of a cable connection, and the external device 1 is provided with a communication system which allows communication with a plurality of electric power steering control devices 2.

As described above, in Embodiment 3, the communication is executed on a wireless basis, and a protocol is established which allows communication with a plurality of electric power steering control devices 2, whereby it is possible to effect communication between a single external device 1 and a plurality of electric power steering control devices 2, thereby simplifying the equipment.

Embodiment 4

While in the above-described embodiments a value (torque correction value) for restraining the reading error of the torque signal used is stored, a gain correction value can be stored in Embodiment 4. The construction of the power steering system of Embodiment 4 is the same as that of one of the above-described embodiments.

In order that an ideal torque signal may be obtained independently of the level of the torque signal used or the circuit accuracy of the controller 3, the torque signal used is corrected by a gain correction value, making it possible to cancel the above-mentioned influence.

That is, in the power steering system of this Embodiment 4, it is possible to store a gain correction value in the storage portion 23 in the electric power steering control system 2 so that an ideal torque may be obtained for the torque signal used in the electric power steering control device 2.

As described above, in this Embodiment 4, signal level can be corrected by multiplying the torque signal used by the controller 3 by an arbitrary gain correction value, making it possible to store the gain correction value. In order that an ideal torque signal may be obtained independently of the level of the torque signal used or the circuit accuracy of the controller, the torque signal used is corrected by the gain correction value, making it possible to cancel the above-mentioned influence.

Further, in accordance with this invention, the above-mentioned torque correction value is a gain correction value of a torque signal, thereby making it possible to cancel the influence of a reading error.

What is claimed is:

1. A power steering system comprising:
    an external device which outputs 2 torque signal in an error measurement mode; and
    an electric power steering device which detects a torque value of the torque signal output by the external device, computes a differential between the detected torque value of the torque signal and a reference torque value, stores the differential as a torque correction value, and, in an actual control mode, uses the torque correction value to correct a detected torque value of a steering torque applied to a steering system of a vehicle.

2. A power steering system according to claim 1, wherein the external device includes:
    a storage instruction portion for providing instructions to the electric power steering device to operate in the error measurement mode; and
    a condition setting portion for outputting the torque signal, and
    wherein the electric power steering control device includes:

a torque sensor for detecting steering torque applied to the steering system of the vehicle;

a motor for generating a steering assistance torque in accordance with a control current; and a controller having a detecting portion for detecting the torque value of the torque signal through the torque sensor, a computing portion for computing the differential between the detected torque value and the reference torque value, a storage portion for storing the differential as the torque correction value, and a control portion which, in the actual control mode, corrects the detected torque value of the steering torque applied to the steering system detected by the torque sensor by the torque correction value and outputs a control current for the motor on the basis of the corrected torque value.

3. A power steering system according to claim 1, wherein the torque correction value is a gain correction value of the torque signal.

4. A power steering system according to claim 2, wherein the torque correction value is a gain correction value of the torque signal.

5. A power steering system comprising:

an external device which, in an error measurement mode, outputs torque signal, receives a detected torque value of the torque signal, computes a differential between a detected torque value of the torque signal and a reference torque value, and outputs the differential as a torque correction value; and an electric power steering control device which receives and detects the detected torque value of the torque signal output from the external device, transmits the detected torque value of the torque signal to the external device, stores the torque correction value transmitted from the external device, and, in an actual control mode, uses the torque correction value to correct a detected torque value of a steering torque applied to a steering system of a vehicle.

6. A power steering system according to claim 5, wherein the external device includes:

a first communicating portion which gives instructions to operate in the measurement mode, receives the detected torque value, and outputs the torque correction value; and a condition setting portion for outputting the torque signal, and wherein the electric power steering control device includes:

a torque sensor for detecting a the steering torque applied to a the steering system of a the vehicle;

a motor for generating a steering assistance torque in accordance with a control current; and a controller having a detecting portion for detecting the torque value of the torque signal through the torque sensor, a second communicating portion for transmitting the detected torque value to the external device and receiving the torque correction value, a storage portion for storing the torque correction value received, and a controller which, in the actual control mode, corrects the detected torque value of the steering torque applied to the steering system detected by the torque sensor by the torque correction value and outputs a control current for the motor on the basis of the corrected torque value.

7. A power steering system according to claim 6, wherein the first communicating portion of the external device and the second communicating portion of the controller are connected to each other in a wireless fashion.

8. A power steering system according to claim 5, wherein the torque correction value is a gain correction value of the torque signal.

9. A power steering system according to claim 6, wherein the torque correction value is a gain correction value of the torque signal.

10. A power steering system according to claim 7, wherein the torque correction value is a gain correction value of the torque signal.

* * * * *